US012726487B2

(12) United States Patent
Vipat et al.

(10) Patent No.: US 12,726,487 B2
(45) Date of Patent: Sep. 1, 2026

(54) SYSTEMS AND METHODS FOR INCREASING SECURITY OF CONNECTED VEHICLES

(71) Applicant: Harman International Industries, Incorporated, Stamford, CT (US)

(72) Inventors: Harshawardhan Vipat, San Jose, CA (US); Ravi Puvvala, San Jose, CA (US); Maria Praveen Kumar Yatagiri, Cupertino, CA (US); Prasanna Krishna Harpanhalli, Padmanabhanagar (IN)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 49 days.

(21) Appl. No.: 18/720,568

(22) PCT Filed: Dec. 13, 2022

(86) PCT No.: PCT/US2022/081473
§ 371 (c)(1),
(2) Date: Jun. 14, 2024

(87) PCT Pub. No.: WO2023/114786
PCT Pub. Date: Jun. 22, 2023

(65) Prior Publication Data

US 2025/0063054 A1 Feb. 20, 2025

(30) Foreign Application Priority Data

Dec. 14, 2021 (IN) ............................. 202141058168

(51) Int. Cl.
*G06F 15/16* (2006.01)
*H04L 9/40* (2022.01)
*H04L 67/12* (2022.01)

(52) U.S. Cl.
CPC ...... *H04L 63/1408* (2013.01); *H04L 63/0245* (2013.01); *H04L 63/029* (2013.01); *H04L 67/12* (2013.01)

(58) Field of Classification Search
CPC ............. H04L 63/1408; H04L 63/0245; H04L 63/029; H04L 67/12
See application file for complete search history.

(56) References Cited

U.S. PATENT DOCUMENTS 11,670,416 B2 * 6/2023 Xavier .................... H04L 69/40
709/230
2017/0034091 A1 * 2/2017 Egilmez .................. H04L 51/42
(Continued)

OTHER PUBLICATIONS

Hatcher, W. et al., "Edge Computing Based Machine Learning Mobile Malware Detection," Proceedings of the 9th Annual Cyber Security Summit, Jun. 6, 2017, Huntsville, Alabama, 6 pages.
(Continued)

*Primary Examiner* — Normin Abedin
(74) *Attorney, Agent, or Firm* — McCoy Russell LLP

(57) ABSTRACT

Examples are disclosed for systems and methods for monitoring and filtering data transmitted to a vehicle connected to a wireless network. In one embodiment, a method for an edge node of a wireless network comprises routing traffic of the wireless network to a vehicle connected to the wireless network through the edge node; examining the traffic for potentially malicious content at the edge node; transmitting data packets of the traffic without potentially malicious content to the vehicle; and not transmitting data packets of the traffic with potentially malicious content to the vehicle.

20 Claims, 4 Drawing Sheets

(56) References Cited

U.S. PATENT DOCUMENTS

| | | | | |
|---|---|---|---|---|
| 2018/0262466 | A1* | 9/2018 | Atad | H04L 63/0245 |
| 2019/0379683 | A1* | 12/2019 | Overby | G06F 13/4068 |
| 2022/0057221 | A1* | 2/2022 | Strygulec | H04W 4/024 |
| 2022/0066833 | A1* | 3/2022 | Strygulec | G06F 16/29 |
| 2022/0103578 | A1* | 3/2022 | Srivastav | H04L 67/12 |

OTHER PUBLICATIONS

Sha, K. et al., "A survey of edge computing-based designs for IoT security," Digital Communications and Networks, vol. 6, No. 2, May 2020, 13 pages.

ISA European Patent Office, International Search Report and Written Opinion Issued in Application No. PCT/US2022/081473, Mar. 31, 2023, WIPO, 12 pages.

* cited by examiner

300

Start 302 initialize edge node client app 304 get current location of vehicle 306 discover nearest edge node for location 308 already connected to edge node?

NO 310 connect to edge node 312 change network configuration to route all traffic through edge node

YES 314 collect log/sensor info of the vehicle 316 compute security posture and send to edge node 318 delay until next sampling time End

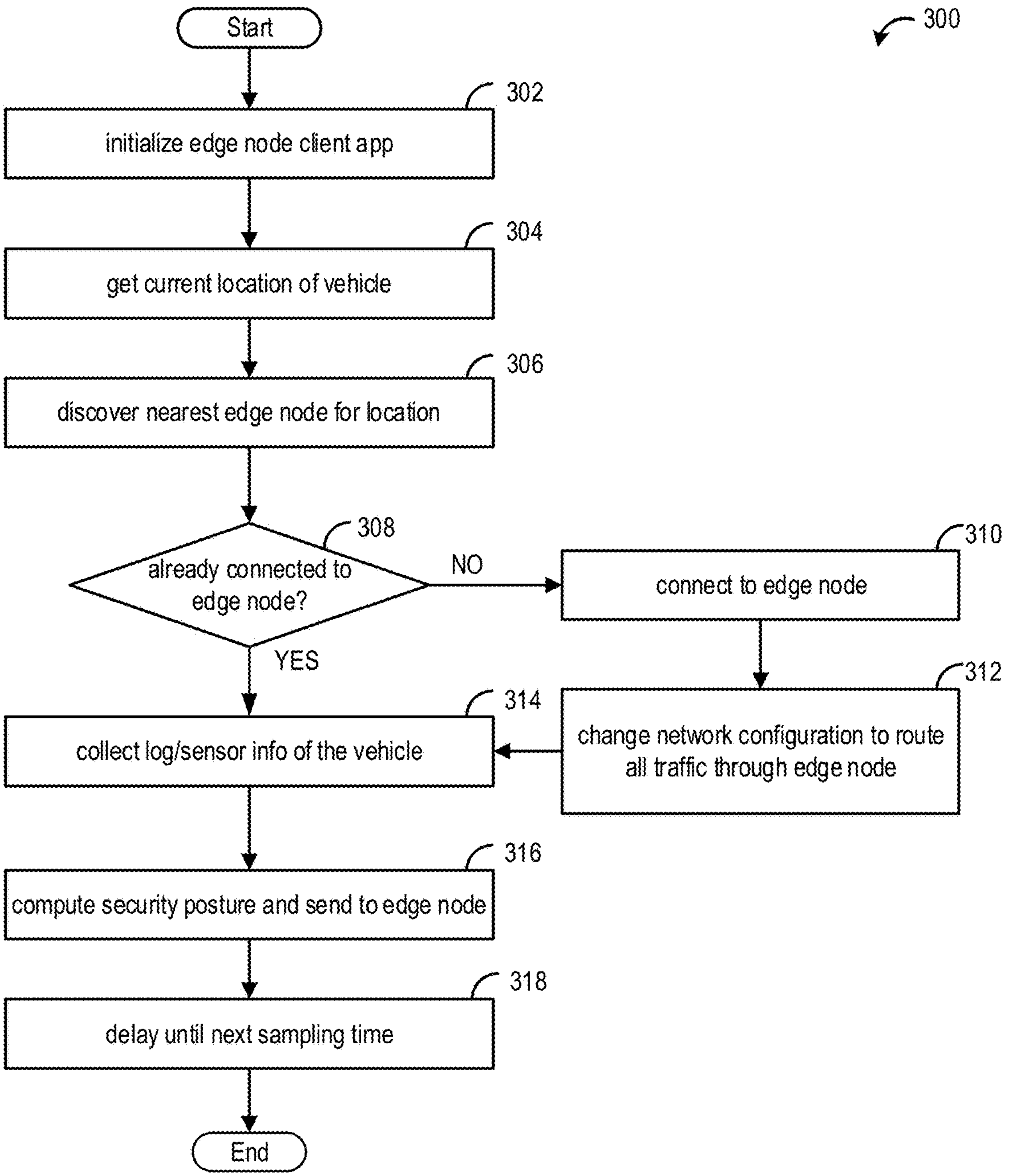

FIG. 3

SYSTEMS AND METHODS FOR INCREASING SECURITY OF CONNECTED VEHICLES

CROSS-REFERENCE TO RELATED APPLICATIONS

The present application is a U.S. National Phase of International Application No. PCT/US2022/081473, entitled "SYSTEMS AND METHODS FOR INCREASING SECURITY OF CONNECTED VEHICLES", and filed on Dec. 13, 2022. International Application No. PCT/US2022/081473 claims priority to Indian Provisional Application No. 202141058168, entitled "SYSTEMS AND METHODS FOR INCREASING SECURITY OF CONNECTED VEHICLES", and filed on Dec. 14, 2021. The entire contents of each of the above-listed applications are hereby incorporated by reference for all purposes.

FIELD

The disclosure relates generally to cybersecurity, and more particularly, to the prevention of cybersecurity attacks on connected vehicles.

BACKGROUND

Most modern vehicles today are connected vehicles, equipped with cellular modems, that use a cellular connection (4G/5G) to gain access to the internet. The vehicles use Internet connectivity to exchange data with original equipment manufacturers (OEM) and 3rd party backend systems for enhancing operation of the vehicle, increasing safety, and providing value added services such as entertainment and maintenance to their owner/drivers.

However, connectedness introduces a problem from a security perspective. A typical connected vehicle is estimated to have tens of millions of lines of code, and thus may have a large number of potential vulnerabilities that could be exploited by an attacker. Using the network as an attack point, the attacker may compromise the safe operation of a connected vehicle, or steal data and personal information from its users. Moreover, network-based attacks can be mounted from a remote location without the need for the close proximity to the vehicle, which significantly increases the possibilities of weaponization and high-impact class and ransomware attacks on OEMs and end users.

SUMMARY

In various embodiments, the issue described above may be addressed by a method for an edge node of a wireless network, comprising routing traffic of the wireless network to a vehicle connected to the wireless network through the edge node; examining the traffic for potentially malicious content at the edge node; transmitting data packets of the traffic without potentially malicious content to the vehicle; and not transmitting data packets of the traffic with potentially malicious content to the vehicle. By monitoring and filtering network traffic to the vehicle at the edge node, an introduction of malicious content into the vehicle may be prevented, thereby ensuring that functions of the vehicle are not disabled, co-opted, or compromised. Additionally, personal and/or private information of users of the vehicle may be protected from intruders. An additional advantage of monitoring and filtering the network traffic to the vehicle at the edge node is that the edge node may provide greater protection than the vehicle due to greater compute, storage, and memory resources. The edge node may avail of additional security components such as firewalls, a secure web gateway, a secure domain name system (DNS), and an access broker. The edge node may have a better vantage point for instrumenting protections, and better visibility over a security posture of the vehicle. Further, an edge-hosted solution may have lower latencies and be easier to maintain updated than vehicle-hosted solutions, while simpler network routes and fewer forwarding hops may offer greater reliability and more consistent round-trip times (RTT) than cloud-hosted solutions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The disclosure may be better understood from reading the following description of non-limiting embodiments, with reference to the attached drawings, wherein below:

FIG. 3 is a flowchart illustrating an exemplary procedure for a vehicle to connect to an edge node of a connected vehicle system, in accordance with one or more embodiments of the present disclosure.

DETAILED DESCRIPTION

Figure 1:
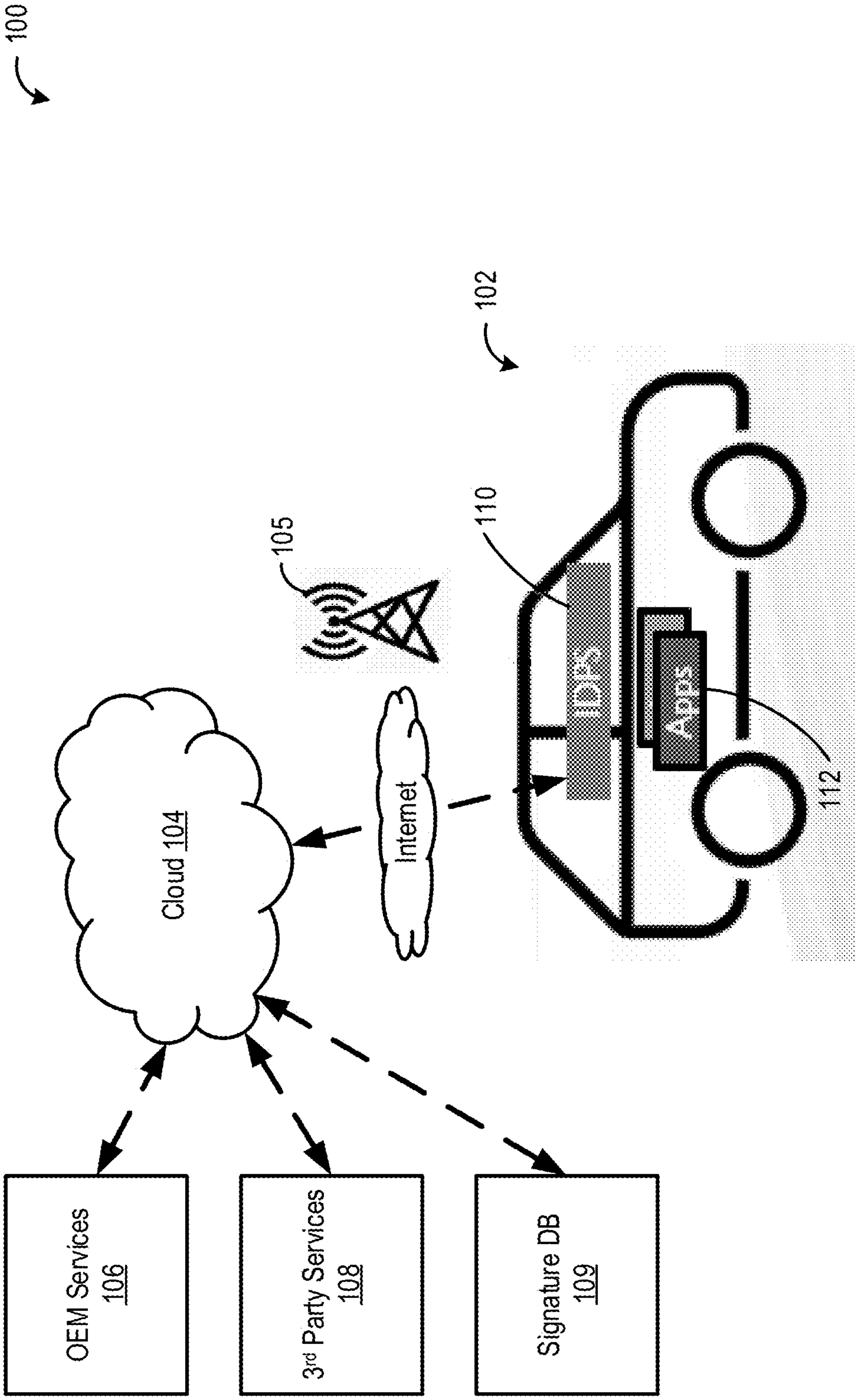
FIG. 1 is a schematic block diagram of a typical connected vehicle as prior art.

The following detailed description relates to a framework for increased security for connected vehicles. More specifically, a framework is described that allows for detection and prevention of network attacks on the connected-vehicles using edge-computing. Network attacks can be used to compromise vehicle controls (e.g., braking, acceleration, steering control, etc.), or vehicle protocol signaling, such as on Vehicle-to-Everything (V2X) or Citizens Broadband Radio Service (CBRS) networks, which can result in compromised functional safety. By thwarting network attacks, an attack surface of a vehicle and risks to functional safety and class attacks may be reduced.

Edge computing is a computing paradigm in which processing of data transmitted over a network takes place at a computing device, referred to as an edge node, that is physically closer to where the data is being produced or consumed, rather than where the data is transmitted from. An edge node is a computing device that provides a network interface to other nodes of a cluster of client devices in cluster computing. Edge-based computing offers several advantages over cloud-based computing, such as lower access latency, localization, and faster/efficient access to cached information.

Modern cellular (4G/5G) networks offer edge hosting facilities as infrastructure as a service (IaaS). An IaaS framework provides on-demand/scalable availability of computing, storage, and network resources. Rather than sending data across the Internet to be processed at a data center in a cloud, computing, storage, and network resources are located at edge nodes closer to clients at the edge of a radio network, or in a core network of the operator. Data coming from and going to the clients can be inspected and/or processed on the edge nodes with near real-time latencies. In the context of a connected vehicle system, network traffic to and/or from vehicles may be routed through a nearest edge-node, where data packets of the network traffic may be examined and filtered before being allowed to pass through to the vehicles. As a result, malicious content may be prevented from accessing the vehicles, including personal/private information leaking from the vehicles.

An edge-based approach to security has a number of advantages over managing security at the vehicle. Computing power, memory, and storage at an edge node may be greater than what is typically available at the vehicle, allowing more powerful threat detection and mitigation routines to be executed with well-established, full-scale, and feature-rich counter-measure technologies. For example, advanced protections such as anomaly detection and deep packet inspection using artificial intelligence (AI) and/or machine learning (ML) approaches may be possible at edge nodes, but not at the vehicle. With lower access latencies and localization, a tighter integration with in-vehicle solutions is possible. Resources of an edge node can function as an extension of in-vehicle resources, and edge-based protections may compliment or strengthen existing in-vehicle protections.

Additionally, maintaining vehicle-based security solutions up-to-date may rely on deploying updates and patches at millions of vehicles on a regular basis. This may be most costly, time consuming, and entail more network traffic than updating an edge-based solution that may be used by a plurality of nearby vehicles. An edge service may scan, cache, and distribute over the air (OTA) patches and configure filtering rules based on security posture information derived from contents of the OTA patches, allowing for easier maintenance.

Figure 2:
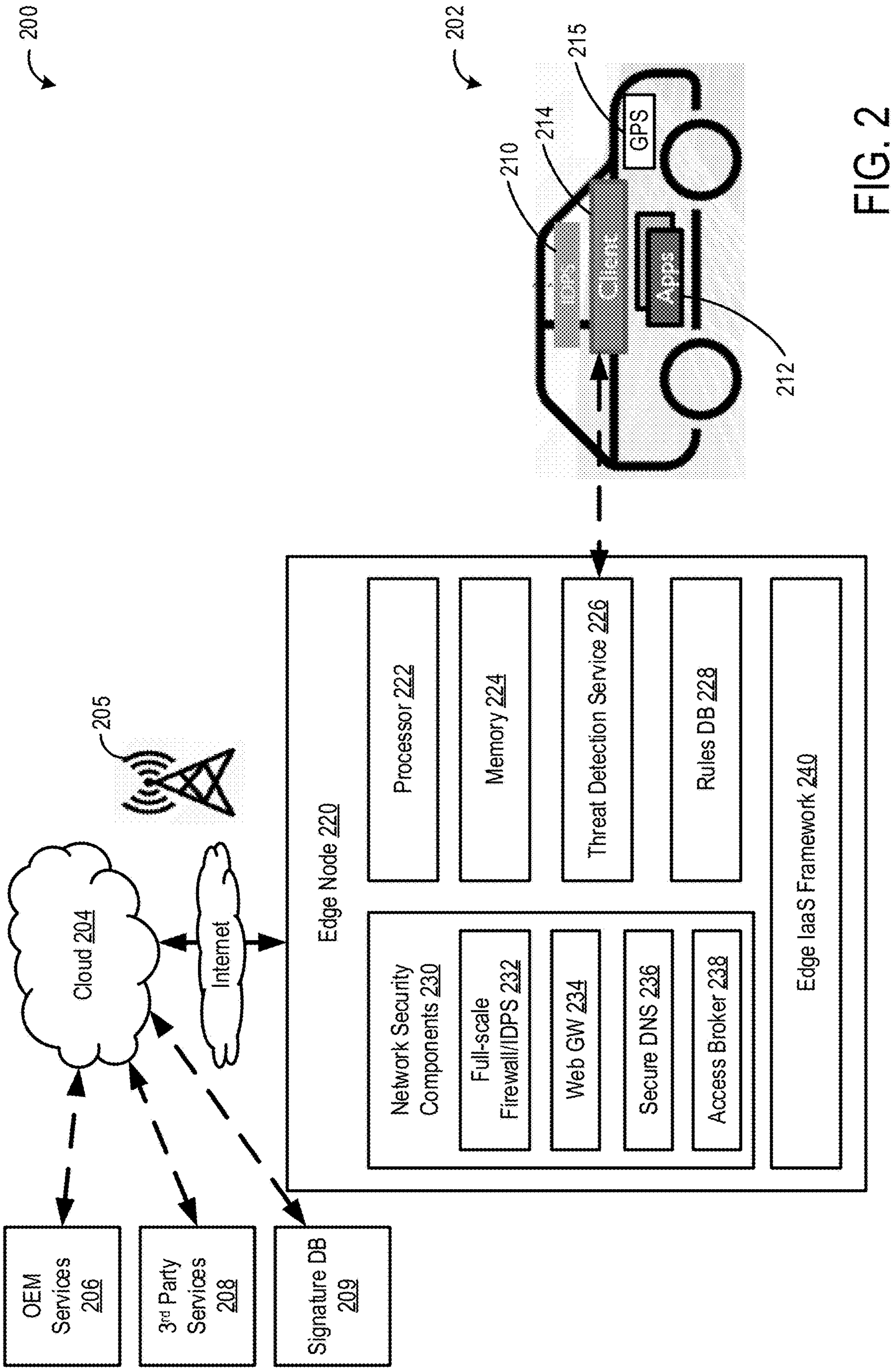
FIG. 2 is a schematic block diagram of a connected vehicle system with an edge node, in accordance with one or more embodiments of the present disclosure.

An exemplary connected vehicle architecture based on edge computing is shown in FIG. 2, which stands in contrast to an existing connected vehicle architecture not based on edge computing shown in FIG. 1. A vehicle within the exemplary connected vehicle architecture shown in FIG. 2 may connect to the Internet and/or one or more cloud services via an edge node, by following one or more steps of a procedure described in FIG. 3. Threats detected in network traffic transmitted to the vehicle may be filtered out by an edge service running in the edge node, by carrying out one or more steps of a procedure described in FIG. 4.

Referring now to FIG. 1, an existing connected-vehicle architecture 100 is shown. Connected vehicle architecture 100 includes a vehicle 102 connected to a cloud 104 via the Internet. Vehicle 102 may connect to the Internet using a wireless network 105. In various embodiments, wireless network 105 may be a cellular network, and vehicle 102 may connect to wireless network 105 via a cellular modem, although wireless network 105 may also include other types of wireless networks. Various in-vehicle applications 112 exchange data with various systems and services, including OEM services 106 and 3$^{rd}$ party backend services 108 via cloud 104. OEM services 106 and third party backend services 108 may run on servers of private/public datacentres of cloud 104.

In various embodiments, OEM services 106 and third party backend services 108 may connect to vehicle 102 to issue updates to software components of vehicle 102. For example, a manufacturer of a controller of vehicle 102 (not shown in FIG. 1) may issue periodic updates to various control routines executed by the controller, or a navigational system of vehicle 102 (not shown in FIG. 1) may receive occasional updates that improve a performance of the navigational system. Additionally, via OEM services 106, OEMs may deploy an in-vehicle Intrusion Detection/Prevention System (IDPS) 110 to vehicle 102 to secure the connectivity with vehicle 102 and to protect vehicle 102 from network-based attacks (also referred to herein as cyberattacks). In an network-based attack, an attacker attempts to gain, with malicious intent, unauthorized access to data or functions of a connected computing device.

For example, the network-based attacks may exploit weaknesses in Internet protocols (e.g., TCP/IP, HTTP), and/or operator error based on misinformation. A cyberattack may be a scan attack, where an intruder repeatedly transmits different access codes to gain access to a component of vehicle 102 until a matching code is discovered. If unauthorized access is gained at vehicle 102, spyware may be installed, data may be stolen, and/or one or more controls of the vehicle (e.g., braking, acceleration, steering, etc.) may be disabled or compromised. The network-based attacks may include ransomeware attacks on the OEMs and/or users of vehicle 102 (e.g., drivers and/or passengers), where an intruder may gain access to a component of vehicle 102, and disable the component until/unless the victim pays a ransom. In some cases, a self-replicating computer virus or worm may be introduced that may infect other connected vehicles or entities of a connected vehicle system. An attacker could exploit a vulnerability, gain access to one or more secret keys, and connect to an OEM network or back-end system to compromise it, or the attacker could launch a phishing attack to lure a user to click on a link that leads to a malicious website that downloads a script that overloads a processor of the vehicle and renders a display of the vehicle unresponsive.

IDPS 110 may analyze network traffic to detect vulnerability exploits, and prevent and/or report on them. For example, as described in greater detail below, IDPS 110 may examine data packets for patterns (e.g., signatures) associated with a known exploit, by consulting a set of signatures stored in a memory of vehicle 102 and/or a signature database 109 hosted in cloud 104. IDPS 110 may monitor network traffic for statistical anomalies that may indicate a presence of an exploit. IDPS 110 may employ or work in conjunction with one or more firewalls and/or other security mechanisms to identify and protect exploits from being introduced into vehicle 102.

However, with respect to security, connected-vehicle architecture 100 has several disadvantages. Vehicle 102 may have limited computing, storage, and memory resources, and as such, in-vehicle solutions may be resource constrained and may offer less protection than desired. Additionally, it may be difficult to continuously maintain IDPS 110 and other in-vehicle solutions up to date with the latest malware advancements, which may be rolled out frequently via a process that is expensive and time-consuming for the OEMs. The solutions and/or updates may be model/SKU specific, which may increase testing and distribution efforts of the OEMs. Further, in-vehicle solutions typically have subcomponents coming from different suppliers. Supply chain-based fragmentation makes it difficult for the OEMs to build and provide a uniform, integrated solution that is maintained up-to-date. Since the OEMs operate on multi-year cadence, it is difficult to design future-proof in-vehicle solutions. As a result, traffic from third-party services and direct Internet access (DIA) may bring in unscreened malicious content.

FIG. 2 shows an alternative connected-vehicle architecture 200 for providing increased security to a vehicle 202. Vehicle 202 may be connected to a cloud 204 via a wireless network 205. In various embodiments, wireless network 205 may be a cellular network, and vehicle 202 may connect to wireless network 205 via a cellular modem, although wireless network 205 may also include other types of wireless networks. Wireless network 205 may allow vehicle 202 to connect with one or more OEM services 206, one or more third-party services 208, a signature database 209, and/or other services. In various embodiments, vehicle 202, wireless network 205, cloud 204, OEM services 206, third-party services 208, and signature database 209 may be substantially similar to vehicle 102, wireless network 105, cloud 104, OEM services 106, third-party services 108, and signature database 109 of FIG. 1. However, in FIG. 2, data packets received at vehicle 202 via Internet traffic from cloud 204 are transmitted through an edge node 220. Edge node 220 may provide an additional layer of security, whereby the data packets are checked for threats prior to transmission to vehicle 202. If a threat is detected in a data packet, the data packet may be discarded, or the data packet may be redirected for further analysis.

Edge node 220 may include one or more processors 222, which may carry out instructions stored in a memory 224. The one or more processors 222 may be more powerful than processors available at vehicle 202, whereby a greater amount of computation may be performed at edge node 220 than at vehicle 202. As referred to herein, the memory 224 may include any non-transitory computer readable medium in which programming instructions are stored. For the purposes of this disclosure, the term "tangible computer readable medium" is expressly defined to include any type of computer readable storage. The example methods and systems may be implemented using coded instruction (e.g., computer readable instructions) stored on a non-transitory computer readable medium such as a flash memory, a read-only memory (ROM), a random-access memory (RAM), a cache, or any other storage media in which information is stored for any duration (e.g. for extended period time periods, permanently, brief instances, for temporarily buffering, and/or for caching of the information). Computer memory of computer readable storage mediums as referenced herein may include volatile and non-volatile or removable and non-removable media for a storage of electronic-formatted information such as computer readable program instructions or modules of computer readable program instructions, data, etc. that may be stand-alone or as part of a computing device. Examples of computer memory may include any other medium which can be used to store the desired electronic format of information and which can be accessed by the processor or processors or at least a portion of a computing device.

Edge node 220 may include a threat detection service 226, which may serve as a network interface to edge node 220 from vehicle 202. In various embodiments, threat detection service 226 may intercept data packets destined for vehicle 202 from cloud 204 via wireless network 205, process the data packets for threat detection using resources available at edge node 220, and transmit the processed data packets to vehicle 202. Threat detection service 226 may also intercept data packets sent from vehicle 202 to cloud 204 via wireless network 205, process the data packets for threat detection, and transmit the processed data packets to cloud 204.

For example, an OEM of a component of vehicle 202 may transmit an update to software of the component via wireless network 205. The OEM may send the software update to vehicle 202 via cloud 204 using the OEM services 206. OEM services 206 may packetize the software update into a plurality of data packets to transmit to vehicle 202. At vehicle 202, the data packets may be received and converted into code, which may be installed and/or executed at vehicle 202 (e.g., by a controller of vehicle 202). Prior to receiving the data packets at vehicle 202, the data packets may be routed through threat detection service 226 of edge node 220. Threat detection service 226 may analyze the data packets to determine whether a threat may be included in the data packets. In a first condition, the data packets may be free of any threats. In response to threat detection service 226 not detecting any threats in the data packets, the data packets may be transmitted to vehicle 202. Alternatively, in a second condition, a threat may have been introduced into the data packets (e.g., at the OEM or in cloud 204). If the threat is detected by threat detection service 226, the data packets may not be transmitted to vehicle 202.

In some embodiments, if a threat is detected, a notification may be sent to a driver of vehicle 202 and/or the OEM. Additionally, in some embodiments, data packets including the threat may be redirected for further processing to a different service or component of edge node 220, or a different OEM service 206 or third party service 208 via cloud 204. In this way, malicious activity originating in the Internet or cloud 204 may be discovered upstream of vehicle 204, and vehicle 204 may be maintained protected.

Vehicle 202 may include an IDPS 210, which in various embodiments may be the same as IDPS 110 of FIG. 1. IDPS 210 may interact with and share resources with threat detection service 226 to detect malicious activity and/or content. For example, some security functions of IDPS 210 may be duplicated at edge node 220, where computing, storage, and networking resources may be greater. Other security functions of IDPS 210 may not be duplicated, whereby threat detection service 226 may rely on IDPS 210 to perform the other security functions. As one example, IDPS 210 may be useful for protecting vehicle 202 from attacks originating from other, non-network vectors.

Vehicle 202 may include an in-vehicle client application 214 (also referred to herein as client 214), which may be communicatively coupled to IDPS 210. Threat detection service 226 may communicate with vehicle 202 through client 214. Client application 214 may be executed by a processor of vehicle 202, for example, by a controller of vehicle 202 based on instructions stored in a memory of vehicle 202. In various embodiments, client 214 may use an Access Point Name (APN) based authentication commonly used by Mobile Network Operators (MNOs). The APN is used to identify a cellular connection to be used by the vehicle, and an MNO may define and set attributes of the APN that determine how traffic will be handled when the APN is used by a subscriber.

Client 214 may discover an edge node for vehicle 202 to connect to of a plurality of edge nodes. In various embodiments, client 214 may attempt to connect vehicle 202 to an edge node (e.g., edge node 220) that is closest to vehicle 202, using an in-vehicle global positioning system (GPS) 215. In other embodiments, client 214 may connect vehicle 202 to a different edge node that is not the closest edge node to vehicle 202, for example, if the different edge node has a stronger signal (e.g., where a signal from the closest edge node may be obstructed). Client 214 may establish a connection via a process that may be repeated periodically in the background, to allow vehicle 202 to remain connected to the nearest edge node while in motion.

Client 214 may set up a network configuration of the vehicle to route all the network traffic through edge node 220, where the network traffic may be monitored and filtered by threat detection service 226, as described in greater detail herein. Client 214 may periodically send data pertaining to a security posture of vehicle 202 to threat detection service 226. This information may include, for example, software versions of various components, events from activity logs, sensor information, access patterns (United Nations Economic Commission for Europe/UNECE WP.29 mandates) and the like.

By connecting to threat detection service 226, client 214 may avail of greater resources, including processing power, memory, and other security resources that may not be available at vehicle 202. For example, edge node 220 may include a plurality of network security components 230. In various embodiments, the network security components 230 may be commercially available components that include network security functions, such as a full-scale firewall/IDPS 232, a secure web gateway 234, a secure DNS 236, and an access broker 238. Full-scale firewall/IDPS 232 may be similar to IDPS 210, but may take advantage of greater capabilities offered at edge node 220. For example, processor 222 may be more powerful than a processor of a controller of vehicle 202 used by IDPS 210. Gateway 234 may inspect and redirect web traffic, for example to prevent a user from going to a malicious website. DNS 236 may translate a URL to an internet address of a server. For example, when a user wishes to go to a website, DNS 236 may provide a correct internet address of a server that hosts the website, which may provide protection against a DNS-based attack. Access broker 238 may control access to various local and/or remote resources based on a security policy.

In various embodiments, threat detection service 226 and network security components 230 may work in conjunction using a rule-based filtering/access control framework for monitoring, blocking, redirecting, and filtering network traffic. For example, the rule-based filtering/access control framework may rely on one or more algorithms that retrieve rules from a rules database 228 of edge node 220, and apply them to detect and/or mitigate vulnerability exploits and/or other malicious content included in data packets transmitted to vehicle 202 via edge node 220. Rules database 228 may include vehicle-specific blocking, filtering, and redirection rules configured by threat detection service 226. Additionally, threat detection service 226 may configure and periodically update rules database 228 based on inputs from other databases, services, and/or processes running on edge node 220. For example, threat detection service 226 may update rules database 228 based on updates from malware signature databases, or common vulnerability and exposures (CVE) databases hosted on cloud 204 or accessible via the Internet. Alternatively, threat detection service 226 may add new rules to and/or update the rules of rules database 228 based on security posture data and artificial intelligence (AI) and/or machine learning (ML) algorithms for anomaly detection.

Edge node 220 may be configured to take advantage of an edge IaaS framework 240. Via the IaaS framework 240, threat detection service 226 may take advantage of on-demand computing, storage, and networking resources available on cloud 204. For example, in an attack scenario, compute resources of edge node 220 may be taxed, and additional compute resources may be desired to analyze the attack, or a number of vehicles in a region where connections are served by an edge node may temporarily spike. In such situations, IaaS may provide on-demand scaling and pay-per-use pricing, which may help avoid overprovisioning, thereby generating savings in operational and/or capital expenditures.

Referring now to FIG. 3, a flowchart is shown illustrating an exemplary method 300 for a vehicle to connect to an edge node of a connected vehicle system. Method 300 may be executed by a controller of the vehicle, in accordance with instructions stored in a memory of the vehicle. In various embodiments, method 300 may be implemented by a client application of the vehicle, such as client application 214 of FIG. 2. Additionally, method 300 may be implemented regularly, for example, as part of a security cycle carried out by the client application.

At 302, method 300 includes initializing the client application. For example, the client application may be configured using a configuration file, which may be read during initialization. Using the configuration file, various default values may be established, and/or one or more sanity checks may be performed.

At 304, method 300 includes determining a current location of the vehicle. The current location of the vehicle may be obtained, for example, from a vehicle guidance system and/or a GPS of the vehicle (e.g., GPS 215 of FIG. 2). At 306, method 300 includes discovering a nearest edge node to the current location. In various embodiments, the edge nodes may be servers running at cellular towers of a wireless, cellular network that the vehicle is connected to, whereby the nearest edge node to the current location may be a nearest cellular tower to the current location. In other embodiments, the wireless network may not be a cellular tower, and the nearest edge node may be located within different infrastructure (e.g., in a building).

At 308, method 300 includes determining whether the vehicle is already connected to an edge node. If at 308 it is determined that the vehicle is already connected to an edge node, method 300 proceeds to 314. If at 308 it is determined that the vehicle is not connected to an edge node, method 300 proceeds to 310.

At 310, method 300 includes connecting to the edge node. Once connected, at 312, method 300 includes changing a network configuration of vehicle to route all network traffic to the vehicle through the edge node, and method 300 proceeds to 314.

At 314, method 300 includes collecting log and sensor information of the vehicle. The log and sensor information may include, for example, software versions of various components of the vehicle. For example, a software version of a first vehicle component may not be protected against a recent virus, and a software version of a second vehicle component may be protected against the recent virus. If the software version information of the first vehicle component and the second vehicle component is collected and transmitted to a threat detection service of the edge node, the threat detection service may apply a first security approach to protecting the vehicle from an introduction of the virus at the first vehicle component, and may apply a second security approach to protecting the vehicle from the virus at the second vehicle component. By applying different security approaches to different elements of network traffic, stronger protection may be provided at the vehicle and an overall computation may be reduced.

The log and sensor information may also include events from activity logs. For example, an activity log entry may reveal that a particular configuration file that is normally not changed was modified. The sensor information may include outputs of one or more sensors of the vehicle, such as a wheel speed sensor, a temperature sensor, a WiFi or Bluetooth® connection sensor, a thermal sensor, and the like. The sensor information may also include key performance indicators, such as a processor load, a memory consumption, a volume of traffic on a network interface, and the like.

At 316, method 300 includes computing a security posture of the vehicle and sending it to the edge node. The security posture may be a collection of information that describes an overall strength or level of protection of the vehicle against cybersecurity threats. The security posture may be used to predict how a cyberattack might be carried out to prevent attacks and/or unauthorized intrusions. The security posture may change over time. For example, the vehicle may have a first security posture at a first point in time when software of the vehicle has been recently updated, and the vehicle may have a second, weaker security posture at a second point in time when software of the vehicle is out of date.

In various embodiments, the security posture may be transmitted to the edge node as a set of key-value pairs in a human/machine readable extensible format such as JavaScript Object Notation (JSON). For example, a key-value pair may include a name of a sensor, and a value of an output of the sensor, or a key-value pair may include a name of an event, and a data associated with the event. The security posture may include additional information, such as an ID of the vehicle and/or a timestamp.

At 318, method 300 includes delaying until a next sampling time. Method 300 ends.

Figure 4:
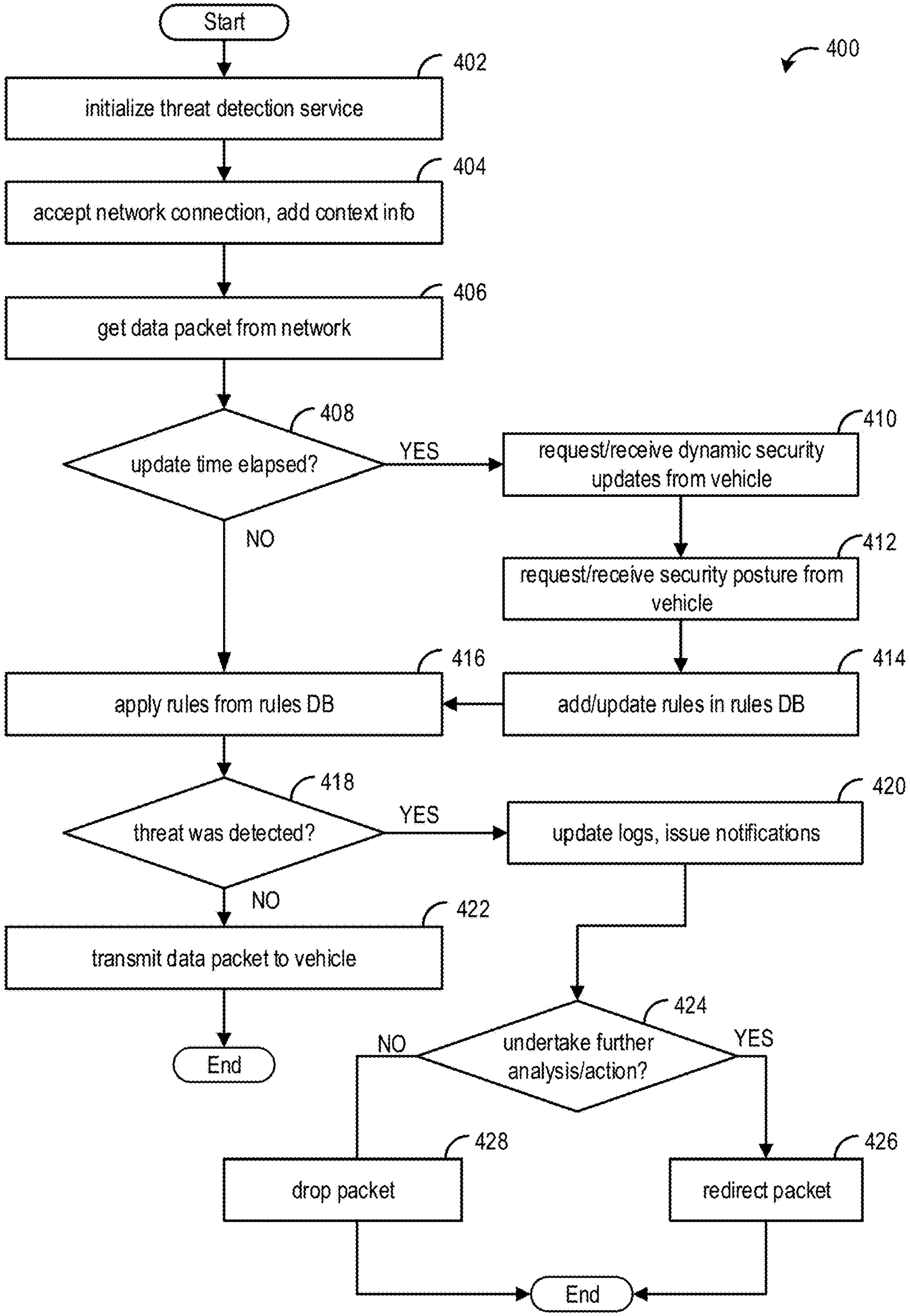
FIG. 4 is a flowchart illustrating an exemplary procedure for monitoring network traffic transmitted to vehicles for threats at an edge node of a connected vehicle system, in accordance with one or more embodiments of the present disclosure.

Referring now to FIG. 4, a flowchart is shown illustrating an exemplary method 400 for monitoring network traffic transmitted to vehicles via a wireless network (referred to herein as the network) for threats at an edge node of a connected vehicle system. In various embodiments, the network may be a cellular network, where data is transmitted via fixed-location transceivers, and the edge node may be located at a transceiver of the fixed-location transceivers. Method 400 may be executed by a processor of the edge node in accordance with instructions stored in a memory of the edge node, such as processor 222 and memory 224 of edge node 200 of FIG. 2. In various embodiments, method 400 may be implemented by a threat detection service, such as threat detection service 226 of FIG. 2.

At 402, method 400 includes initializing the threat detection service of the edge node. In some embodiments, initializing the threat detection service may include reading one or more configuration files, connecting to a rules database, and setting up filtering rules. Initialization may also include preparing to receive new connection requests.

At 404, method 400 includes accepting a network connection from a vehicle connected to the network, and adding context information to the network connection. For example, the context information may include an ID of the vehicle, a location of the vehicle, and IP address of the vehicle, and/or other vehicle-specific details received from the client application.

In various embodiments, the vehicle may select the edge node as being a most suitable edge node of the network for the vehicle to connect to (e.g., as described above in reference to method 300 of FIG. 3). For example, a proximity of the edge node to the vehicle may be less than a threshold proximity, and/or less than a proximity of the vehicle to other edge nodes of the network. In various embodiments, the vehicle may transmit a request to the selected edge node to connect the vehicle to the network via the edge node, so that the vehicle may route all incoming traffic from the network to the vehicle through the edge node, and route all outgoing traffic from the vehicle to other entities of the network through the edge node.

At the time of accepting the network connection, the edge node (e.g., the threat detection service) may request that the vehicle transmit a security posture of the vehicle. The security posture may include security status information of the vehicle, such as a list of processes established at the vehicle to protect components of the vehicle and/or users of the vehicle (e.g., a driver and passengers of the vehicle) from malicious activity originating at other locations on the network and transmitted to the vehicle via the network. The security posture may also include security statuses of various software, hardware, services, or networks of the vehicle. The security posture may be a strong security posture, indicating that the vehicle may be well protected from threats introduced over the network, or the security posture may be a weak security posture, indicating that the vehicle may not be well protected from threats introduced over the network. The security posture may also change over time. For example, the vehicle may have a strong security posture at a first time, and a weak security posture at a second time. A change in the security posture may be due to a degradation in one or more components of the vehicle, or due to a vulnerability introduced as a result of a recent software update, or as a result of not having updated software, or for a different reason.

At 406, method 400 includes receiving a data packet from the network destined for the vehicle. The data packet may be an initial data packet, meaning, a first data packet of a stream of data packets destined for the vehicle after an initialization of the threat detection service, or the data packet may be a next data packet of the stream of data packets destined for the vehicle received at a time after the initialization. The data packet may be analyzed individually, where each data packet of the data packet is checked for threats. The data packet may also be analyzed in conjunction with other preceding or subsequent data packets, where a group of one or more data packets may be analyzed for patterns of data existing across data packets that may be indicative of a threat.

At 408, method 400 includes determining whether an amount of time has elapsed since security information (e.g., the security posture) of the vehicle has been received from the vehicle and updated at the edge node. For example, the security posture may be initially transmitted to the edge node upon an acceptance of the network connection to the vehicle by the edge node. In various embodiments, the security posture may be updated regularly at the edge node at pre-configured time intervals. For example, an update timer may be set at the edge node each time the security posture is updated, and when the update timer indicates that the pre-configured time interval has been reached, the edge node may request an updated version of the security posture from the vehicle. In some embodiments, the updated version may be sent on request, while in other embodiments, no request may be made by the edge node, and the vehicle may send an updated security posture at the pre-configured time intervals. In some embodiments, the pre-configured time intervals may be adjusted by either the vehicle or the edge node, for example, in response to irregular activity being detected in one or more systems of the vehicle and/or the network.

If at 408 it is determined that the amount of time has elapsed without the security posture of the vehicle being updated at the edge node, method 400 proceeds to 410. At 410, method 400 includes requesting and/or receiving dynamic security updates from the vehicle. The dynamic security updates may include, for example, new rules, new whitelists and/or blacklists, new malware signatures, policy updates, and the like. At 412, method 400 includes requesting and/or receiving the updated security posture (e.g., information about a state of the vehicle) from the vehicle, and method 400 proceeds to 414.

At 414, method 400 includes adding and/or updating one or more rules in a rules database of the edge node. In various embodiments, the threat detection service may use one or more rule-based filtering/access control algorithms to analyze and block, redirect, or filter data packets of the network traffic destined for the vehicle. The algorithms may retrieve rules from a rules database (e.g., the rules database 228 of FIG. 2), and apply the rules to determine whether any potential malicious activity or content might be included in the data packets. The rules may establish a condition to apply to the data packets based on one or more types of security and/or vulnerability information.

In some embodiments, a rule may be based on a security posture of the vehicle. For example, a rule may establish that a stricter filtering criteria/mechanism be used if the vehicle is determined to be in a weaker security posture. Additionally or alternatively, a rule may be based on data received from a malware signature database or a common vulnerability and exposures (CVE) database hosted in a cloud (e.g., the cloud 204 of FIG. 2) that maintains lists of data and/or network activity patterns (e.g., signatures) that are associated with different known malware and/or vulnerability exploits. For example, a first rule may establish that if a first pattern of network activity is detected, then a first exploit commonly associated with the first pattern may be indicated. A second rule may establish that if a second pattern of network activity is detected, then a second exploit commonly associated with the second pattern may be indicated. In this way, a rule-based filtering/access control algorithm (also referred to herein as the algorithm) may apply the first rule to protect the network traffic from the first exploit potentially being included in the network traffic. In response to detecting the second pattern of activity in network traffic to the vehicle, the rule-based filtering/access control algorithm may apply the second rule to protect the network traffic from the second exploit potentially being included in the network traffic.

Further, in some embodiments, a rule may be based on an output of an artificial intelligence (AI) or machine learning (ML) anomaly detection algorithm running at the edge node. For example, the AI/ML anomaly detection algorithm may be trained on network activity patterns, or patterns in data in data packets received at the edge node, to detect malicious activity in the data and network activity patterns. A rule may then establish that if an output of a trained AI/ML anomaly detection algorithm indicates potential malicious activity, then an associated threat may be indicated.

At 416, method 400 includes applying the rules from the rules database to examine the data packet for potential malicious activity. As an example, in an embodiment, an algorithm may examine data of the data packet to determine if a known data pattern corresponding to known malicious activity or content may be included in the data packets. Based on the data, the algorithm may select a subset of rules from the rules database against which to check the data. For example, data of a first type, or having a first characteristic, may be checked against a first subset of rules; data of a second type, or having a second characteristic, may be checked against a second subset of rules, and so on. Each rule of the subset of rules may be structured in a condition/result pair, where if a condition of a rule is satisfied, a result of the rule may be indicated. The algorithm may iteratively compare the data to a condition of each rule of the subset of rules to determine whether each condition is satisfied. If a condition is satisfied by the data, the algorithm may indicate the result defined in the rule. If the condition is not satisfied by the data, the algorithm may not indicate the result defined in the rule. In this way, the algorithm may use the rules to detect a potential threat based on the data of the data packet.

In some embodiments, a different subset of rules may be additionally or alternatively selected based on patterns in network activity including the data packet. For example, a different rule-based filtering/access control algorithm may examine network activity for patterns existing across various data packets of the data packet. If a network activity pattern appears to match a condition of one or more of the rules of the different subset of rules, one or more results may be indicated. Alternatively, the network activity may be supplied as input into an AI/ML algorithm, and an output of the AI/ML algorithm may be used to specify one or more rules to apply.

In some embodiments, a plurality of different rule-based filtering/access control algorithms may be used in combination to detect malicious content in the data packet or in the network activity. For example, a first algorithm may detect a first threat in the data packet, and a second algorithm may detect a second threat in the data packet. The first algorithm and the second algorithm may both detect the first threat, and an action to take to address the first threat may depend on a confirmation of an output of the second algorithm with an output of the first algorithm. In other examples, in response to the first algorithm detecting the first threat, the first algorithm may indicate applying the second algorithm to the data packet or network activity. In this way, various algorithms and various rules may be employed by the threat detection service to monitor incoming traffic and filter, block, or redirect data packets with potential malicious content.

At 418, method 400 includes determining whether a threat was detected in the data packet, based on an application of rules by the rule-based filtering/access control algorithms. If it is determined that potentially malicious content is not included in the data packet, method 400 proceeds to 422. At 422, method 400 includes transmitting the data packet from the edge node to the vehicle, and method 400 ends.

Alternatively, if at 418 it is determined that potentially malicious content may be included in the data packet, method 400 proceeds to 420. At 420, method 400 includes updating one or more logs with information about the potentially malicious activity and issuing any relevant notifications. The one or more logs may include logs of the threat detection service, or other components of the edge node. In various embodiments, the one or more logs may also include logs of one or more components of the vehicle. In addition to updating logs locally at the edge node and at the vehicle, one or more notifications may be sent to one or more OEMs of components of the vehicle. For example, an OEM of a vehicle component may deploy an update to software of the vehicle component via the network. The update may become corrupted by a vulnerability exploit at the OEM, or during transmission over the network. If the exploit is detected by the threat detection service, the threat detection service may block the software update from deploying at the vehicle, and may send a notification of the detected exploit and/or the blocked update to the OEM via the internet (e.g., via the OEM services 206 of FIG. 2). The notification may include, for example, information about the detected exploit that may aid the OEM in protecting computer systems and/or networks of the OEM.

At 424, method 400 includes determining whether to perform any further analysis or action with respect to the potentially malicious content. If at 424 it is determined that further analysis or action should be performed, method 400 proceeds to 426. If at 424 it is determined that further analysis should be carried out or further action should be taken, method 400 proceeds to 426. At 426, the data packet may be redirected. For example, the data packet may be redirected to an archive for a later forensic analysis, or if the packet carries web traffic (e.g., an HTTP request), it may be redirected to a different web server, which may either return a web page displaying a warning, or an OEM software update web page for downloading a patch.

If at 424 it is determined not to perform any further analysis or action, method 400 proceeds to 428. At 428, method 400 includes dropping the data packet, and method 400 may end.

It should be appreciated that while method 400 describes monitoring network traffic transmitted to the vehicles from the Internet, method 400 may also be applied to monitoring network traffic transmitted from the vehicles to other entities of the network or entities on the Internet. For example one or more steps of method 400 may be performed to filter data transmitted from the vehicle to an OEM. In some embodiments, not all of the steps of method 400 may be applied, or one or more steps of method 400 may be applied in a different order, without departing from the scope of this disclosure.

Thus, a robust framework is provided for increased protection of a connected vehicle from malicious content included in network traffic to the connected vehicle. The network traffic may be monitored and filtered at an edge node of a network, to prevent introduction of malicious content into the vehicle. By preventing the introduction of malicious content, controls of the vehicle may be protected from an intruder seeking to disable or co-opt them. Additionally, personal and/or private information of users of the vehicle may be protected. Because the edge node may have greater compute, storage, and memory resources than the connected vehicle, the resources may be leveraged to increase protection of the vehicle. The edge node may include security components such as firewalls, a secure web gateway, a secure domain name system (DNS), and an access broker that may provide additional protection to the vehicle. Further, the edge node may be easier to maintain up-to-date than protective measures carried out at the vehicle.

The disclosure also provides support for a method for an edge node of a wireless network, comprising: routing traffic of the wireless network to a vehicle connected to the wireless network through the edge node, examining the traffic for potentially malicious content at the edge node, transmitting data packets of the traffic without potentially malicious content to the vehicle, and not transmitting data packets of the traffic with potentially malicious content to the vehicle. In a first example of the method, the method further comprises: routing traffic of the wireless network from the vehicle to a destination over the Internet through the edge node, examining the traffic for potentially malicious content at the edge node, transmitting data packets of the traffic without potentially malicious content to the destination, and not transmitting data packets of the traffic with potentially malicious content to the destination. In a second example of the method, optionally including the first example, the edge node is selected from a plurality of edge nodes of the network based on a proximity of the edge node to the vehicle. In a third example of the method, optionally including one or both of the first and second examples, the method further comprises: in response to detecting potentially malicious content in the traffic, performing at least one of: updating a log with information of the potentially malicious content, and sending a notification of the potentially malicious content to an original equipment manufacturer (OEM) of a component of the vehicle. In a fourth example of the method, optionally including one or more or each of the first through third examples, examining the traffic for potentially malicious content further comprises receiving, from the vehicle, a security posture of the vehicle. In a fifth example of the method, optionally including one or more or each of the first through fourth examples, examining the traffic for potentially malicious content further comprises using a rule-based filtering/access control algorithm to perform at least one of: blocking data packets of the traffic, redirecting data packets of the traffic, and filtering data packets of the traffic. In a sixth example of the method, optionally including one or more or each of the first through fifth examples, one or more rules used by the rule-based filtering/access control algorithm are retrieved from a rules database hosted at the edge node. In a seventh example of the method, optionally including one or more or each of the first through sixth examples, one or more rules of the rules database are added or updated based on inputs from at least one of: the security posture of the vehicle, a malware signature database, a common vulnerability and exposures (CVE) database, an output of an artificial intelligence (AI) or machine learning (ML) anomaly detection algorithm. In an eighth example of the method, optionally including one or more or each of the first through seventh examples, examining the traffic for potentially malicious content at the edge node relies on functions of network security components of the edge node, the network security components including at least: a firewall, a secure domain name system (DNS), a secure web gateway, and an access broker. In a ninth example of the method, optionally including one or more or each of the first through eighth examples: in a first condition, where potentially malicious content is detected in a plurality of data packets of the traffic at the edge node, the plurality of data packets are not transmitted to the vehicle, and in a second condition, where no malicious content is detected in the plurality of data packets of the traffic at the edge node, the plurality of data packets are transmitted to the vehicle. In a tenth example of the method, optionally including one or more or each of the first through ninth examples, the wireless network is a cellular network.

The disclosure also provides support for a method for a vehicle connected to a wireless network, comprising: connecting to an edge node of the network, changing a network configuration of the vehicle to route network traffic to and/or from the vehicle through the edge node, sending a security posture of the vehicle to a threat detection service of the edge node, and receiving filtered network traffic from the edge node, the filtered network traffic filtered based on the security posture. In a first example of the method, connecting to the edge node of the network further comprises: determining a current location of the vehicle, scanning the network to detect a closest edge node of the network to the current location, and connecting to the closest edge node. In a second example of the method, optionally including the first example, the security posture of the vehicle is based on log information of the vehicle and sensor data of the vehicle. In a third example of the method, optionally including one or both of the first and second examples, sending the security posture of the vehicle to the threat detection service further comprises sending an updated security posture of the vehicle to the threat detection service at periodic intervals. In a fourth example of the method, optionally including one or more or each of the first through third examples, sending the security posture of the vehicle to the threat detection service further comprises sending the security posture of the vehicle to the threat detection service in response to receiving a request for the security posture from the threat detection service.

The disclosure also provides support for a system, comprising: an edge node of a cellular network, the cellular network including a plurality of connected vehicles, the edge node including one or more processors having executable instructions stored in a non-transitory memory that, when executed, cause the one or more processors to: accept a request from a vehicle of the plurality of vehicles to route all incoming traffic to the vehicle from the cellular network through the edge node, and to route all outgoing traffic from the vehicle to other entities on the cellular network through the edge node, filter the incoming and outgoing traffic based on one or more rule-based filtering/access control algorithms, and transmit the filtered incoming traffic to the vehicle and the filtered outgoing traffic to the other entities. In a first example of the system, one or more rules used by the one or more rule-based filtering/access control algorithms are based on or updated based on inputs from one or more of: a malware signature database, a common vulnerability and exposures (CVE) database, an output of an artificial intelligence (AI) or machine learning (ML) anomaly detection algorithm, and a security posture of the vehicle transmitted to the edge node from the vehicle. In a second example of the system, optionally including the first example, additional instructions are stored in the non-transitory memory that, when executed, cause the one or more processors to: in response to detecting potentially malicious content in the incoming traffic or outgoing traffic when filtering the incoming or outgoing traffic, perform at least one of: update a log with information of the potentially malicious content, and send a notification of the potentially malicious content to an original equipment manufacturer (OEM) of a component of the vehicle. In a third example of the system, optionally including one or both of the first and second examples, filtering the incoming and outgoing traffic based on one or more rule-based filtering/access control algorithms includes filtering the incoming and outgoing traffic using one or more of: a secure domain name system (DNS) of the edge node, a secure web gateway of the edge node, a firewall of the edge node, and an access broker of the edge node.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the embodiments described above with respect to FIGS. 1-4. The methods may be performed by executing stored instructions with one or more logic devices (e.g., processors) in combination with one or more hardware elements, such as storage devices, memory, hardware network interfaces/antennas, switches, clock circuits, and so on. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," "third," and so on are used merely as labels, and are not intended to impose numerical requirements or a particular positional order on their objects. The following claims particularly point out subject matter from the above disclosure that is regarded as novel and non-obvious.

The invention claimed is:

1. A method for an edge node of a wireless network, comprising:

routing traffic of the wireless network to a vehicle connected to the wireless network through the edge node, wherein from the wireless network destined for the vehicle is intercepted by the edge node prior to reaching the vehicle and data from the vehicle destined for the wireless network is intercepted by the edge node prior to reaching the wireless network;

examining the traffic for potentially malicious content at the edge node as the traffic is routed through the edge node;

transmitting data packets of the traffic without potentially malicious content to the vehicle; and not transmitting data packets of the traffic with potentially malicious content to the vehicle.

2. The method of claim 1, further comprising:

routing traffic of the wireless network from the vehicle to a destination over the Internet through the edge node;

examining the traffic for potentially malicious content at the edge node;

transmitting data packets of the traffic without potentially malicious content to the destination; and not transmitting data packets of the traffic with potentially malicious content to the destination.

3. The method of claim 2, wherein the edge node is selected from a plurality of edge nodes of the wireless network based on a proximity of the edge node to the vehicle.

4. The method of claim 2, further comprising:

in response to detecting potentially malicious content in the traffic, performing at least one of:

updating a log with information of the potentially malicious content; and sending a notification of the potentially malicious content to an original equipment manufacturer (OEM) of a component of the vehicle.

5. The method of claim 2, wherein examining the traffic for potentially malicious content further comprises receiving, from the vehicle, a security posture of the vehicle.

6. The method of claim 5, wherein examining the traffic for potentially malicious content further comprises using a rule-based filtering/access control algorithm to perform at least one of:

blocking data packets of the traffic;

redirecting data packets of the traffic; and filtering data packets of the traffic.

7. The method of claim 6, wherein one or more rules retrieved from a rules database hosted at the edge node by the rule based filtering/access control algorithm are added or updated based on inputs from at least one of:

the security posture of the vehicle;

a malware signature database;

a common vulnerability and exposures (CVE) database;

an output of an artificial intelligence (AI) or machine learning (ML) anomaly detection algorithm.

8. The method of claim 5, wherein the security posture is transmitted to the edge node as a set of key-value pairs.

9. The method of claim 2, wherein examining the traffic for potentially malicious content at the edge node relies on functions of network security components of the edge node, the network security components including at least:

a firewall;

a secure domain name system (DNS);

a secure web gateway; and an access broker.

10. The method of claim 1, wherein:

in a first condition, where potentially malicious content is detected in a plurality of data packets of the traffic at the edge node, the plurality of data packets are not transmitted to the vehicle; and in a second condition, where no malicious content is detected in the plurality of data packets of the traffic at the edge node, the plurality of data packets are transmitted to the vehicle.

11. A method for a vehicle connected to a wireless network, comprising:

connecting to an edge node of the wireless network, wherein the edge node is a server running at a cellular tower of the wireless network;

changing a network configuration of the vehicle to route network traffic to and/or from the vehicle through the edge node, wherein all network traffic outgoing from the vehicle to the wireless network passes through the edge node before reaching the wireless network and all network traffic incoming to the vehicle from the wireless network passes through the edge node before reaching the vehicle;

sending a security posture of the vehicle to a threat detection service of the edge node; and receiving filtered network traffic from the edge node, the filtered network traffic filtered based on the security posture.

12. The method of claim 11, wherein connecting to the edge node of the wireless network further comprises:

determining a current location of the vehicle;

scanning the network to detect a closest edge node of the wireless network to the current location; and connecting to the closest edge node.

13. The method of claim 11, wherein the security posture of the vehicle is based on log information of the vehicle and sensor data of the vehicle.

14. The method of claim 11, wherein sending the security posture of the vehicle to the threat detection service further comprises sending an updated security posture of the vehicle to the threat detection service at periodic intervals.

15. A system, comprising:

an edge node of a cellular network, the cellular network including a plurality of connected vehicles, the edge node including one or more processors having executable instructions stored in a non-transitory memory that, when executed, cause the one or more processors to:

accept a request from a vehicle of the plurality of connected vehicles;

in response to accepting the request from the vehicle, route all incoming traffic to the vehicle from the cellular network through the edge node and route all outgoing traffic from the vehicle to other entities on the cellular network through the edge node, wherein the edge node is selected from a plurality of edge nodes of the cellular network based on signal strength;

filter the incoming and outgoing traffic based on one or more rule-based filtering/access control algorithms; and transmit the filtered incoming traffic to the vehicle and the filtered outgoing traffic to the other entities.

16. The system of claim 15, wherein one or more rules used by the one or more rule-based filtering/access control algorithms are based on or updated based on inputs from one or more of:

a malware signature database;

a common vulnerability and exposures (CVE) database;

an output of an artificial intelligence (AI) or machine learning (ML) anomaly detection algorithm; and a security posture of the vehicle transmitted to the edge node from the vehicle.

17. The system of claim 16, where additional instructions are stored in the non-transitory memory that, when executed, cause the one or more processors to:

in response to detecting potentially malicious content in the incoming traffic or outgoing traffic when filtering the incoming or outgoing traffic, perform at least one of:

update a log with information of the potentially malicious content; and send a notification of the potentially malicious content to an original equipment manufacturer (OEM) of a component of the vehicle.

18. The system of claim 15, wherein filtering the incoming and outgoing traffic based on one or more rule-based filtering/access control algorithms includes filtering the incoming and outgoing traffic using one or more of:

a secure domain name system (DNS) of the edge node;

a secure web gateway of the edge node;

a firewall of the edge node; and an access broker of the edge node.

19. The method of claim 15, wherein the edge node is not the closest edge node in proximity to the vehicle.

20. The system of claim 15, wherein the vehicle comprises an intrusion detection/prevention system (IDPS) that is configured to share resources with the edge node for detection of potentially malicious content in the incoming traffic or outgoing traffic.

* * * * *